Dec. 10, 1935.    R. E. MAYO ET AL    2,023,535
ENGINE
Filed Oct. 3, 1933    3 Sheets-Sheet 1

INVENTORS.
Roy E. Mayo
James M. Davies
BY Charles M. Fryer
ATTORNEY.

Dec. 10, 1935.  R. E. MAYO ET AL  2,023,535
ENGINE
Filed Oct. 3, 1933  3 Sheets-Sheet 2
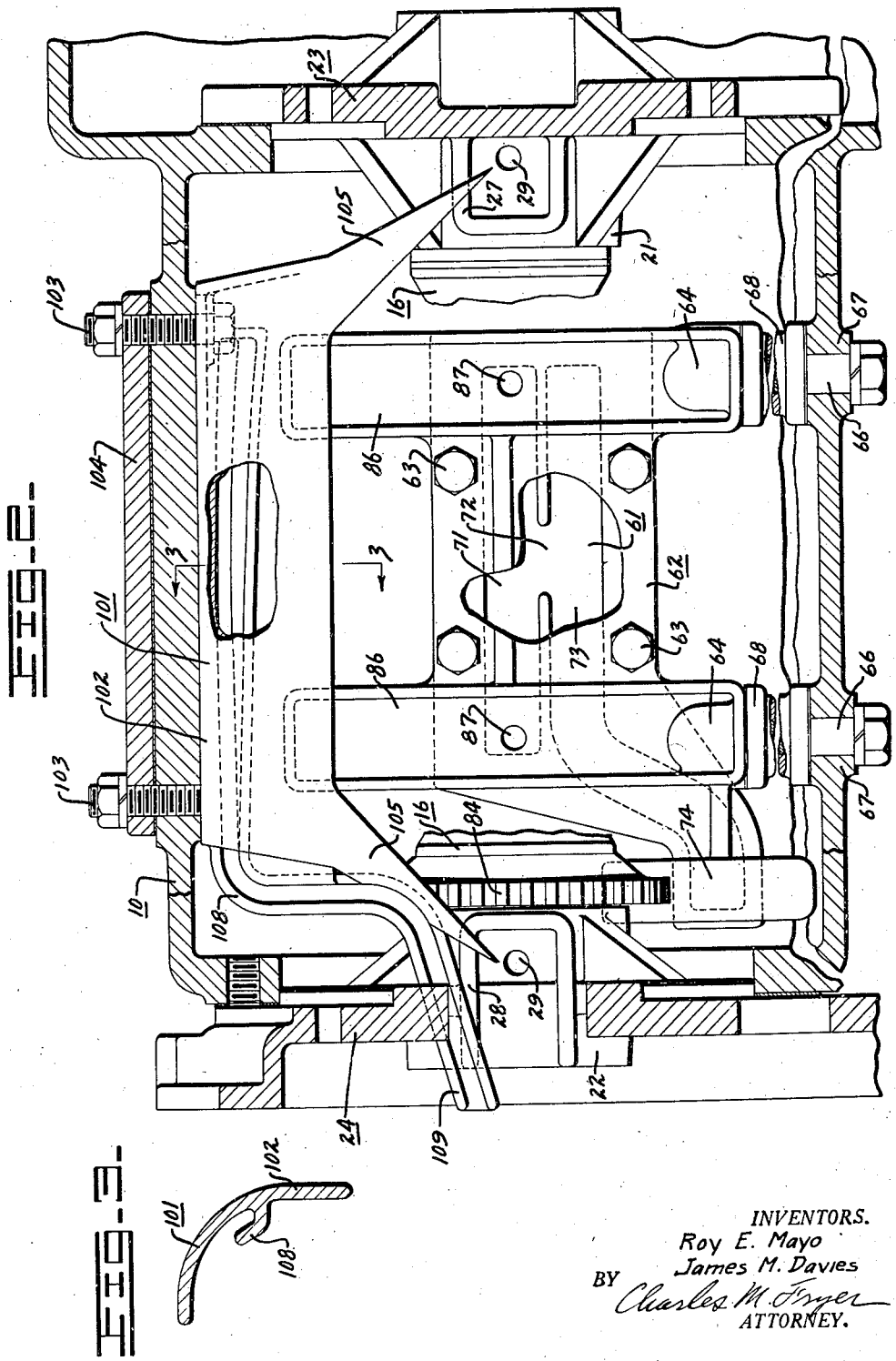
INVENTORS.
Roy E. Mayo
James M. Davies
BY Charles M. Fryer
ATTORNEY.

Dec. 10, 1935.　　　R. E. MAYO ET AL　　　2,023,535
ENGINE
Filed Oct. 3, 1933　　　3 Sheets-Sheet 3
FIG.-4-
FIG.-5-
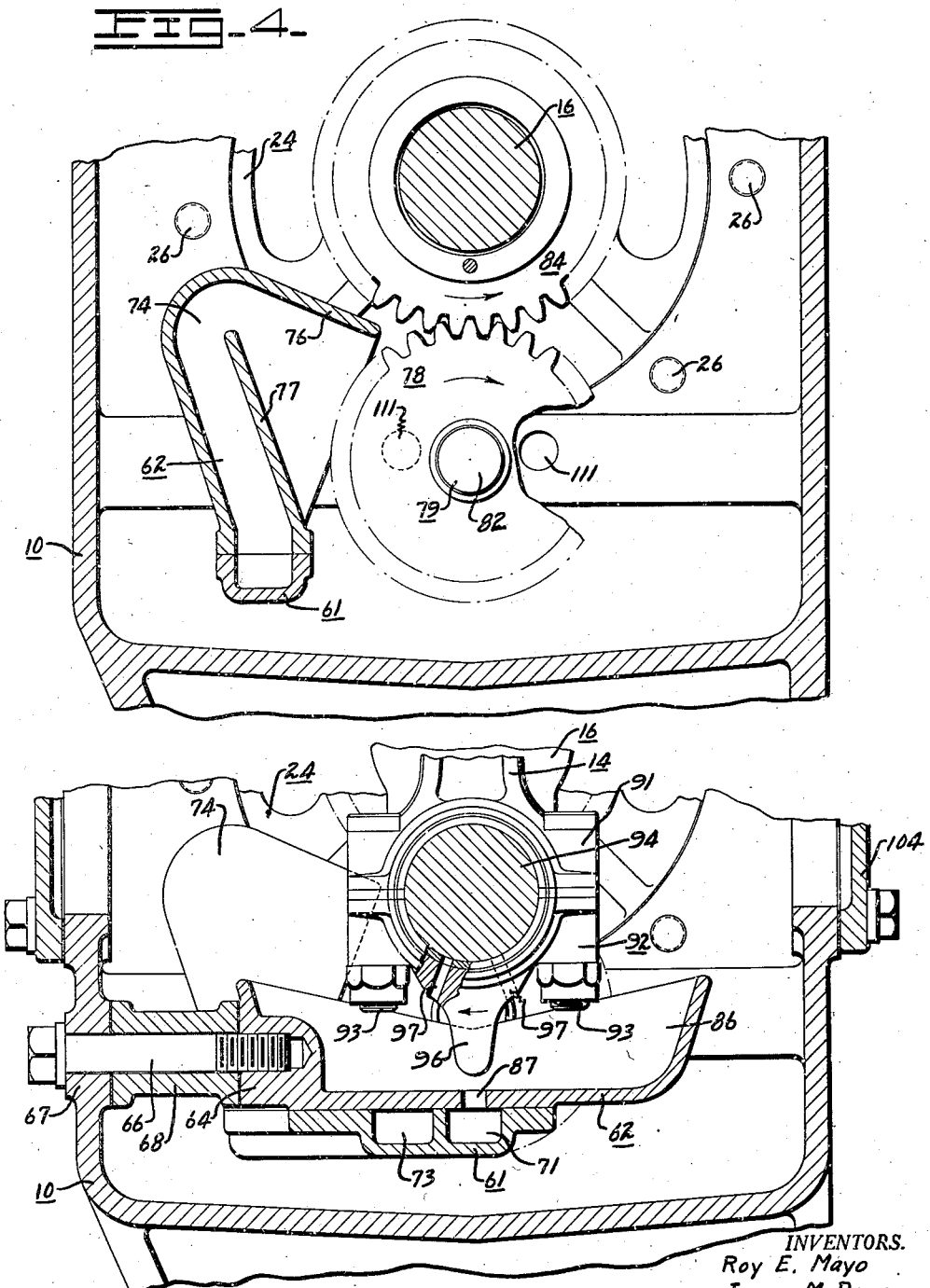
INVENTORS.
Roy E. Mayo
James M. Davies
BY Charles M. Fryer
ATTORNEY.

Patented Dec. 10, 1935

2,023,535

UNITED STATES PATENT OFFICE 2,023,535

ENGINE

Roy E. Mayo, San Leandro, Calif., and James M. Davies, Peoria, Ill., assignors to Caterpillar Tractor Co., San Leandro, Calif., a corporation of California Application October 3, 1933, Serial No. 691,930

7 Claims. (Cl. 184—6)

The present invention relates to internal combustion engines, and more particularly to the provision of a lubricating system therefor.

It is an object of the invention to provide a simple, inexpensive and reliable lubricating system for an internal combustion engine.

Another object of the invention is to provide a positive lubricating system for an internal combustion engine which eliminates the usual lubricant pump and bored passages in the engine block and crankshaft.

Another object of the invention is to provide a lubricating system in which a gravity flow of lubricant is provided to the bearing surfaces of the engine.

Another object of the invention is to provide a splash lubricating system which incorporates power driven means for insuring a constant supply of lubricant to the splash elements.

A further object of the invention is the provision of an inexpensive lubricating system for an engine which is not operated for any substantial length of time, such as is the case with respect to an auxiliary starting engine for a compression ignition engine.

Other objects will appear as the description progresses.

Description of figures

Fig. 2 is a horizontal section taken on the line 2—2 in Fig. 1, illustrating the lubricating system in plan.

Fig. 3 is a detailed section through the lubricant distributor taken on the line 3—3 in Fig. 2.

Fig. 4 is a transverse vertical section taken on the line 4—4 in Fig. 1, disclosing the power driven means for supplying lubricant to the splash troughs.

Fig. 5 is a transverse vertical section taken on the line 5—5 in Fig. 1, illustrating the splash trough construction and the bearing cap extension which transfers lubricant from the trough.

Description of mechanism

Figure 1:
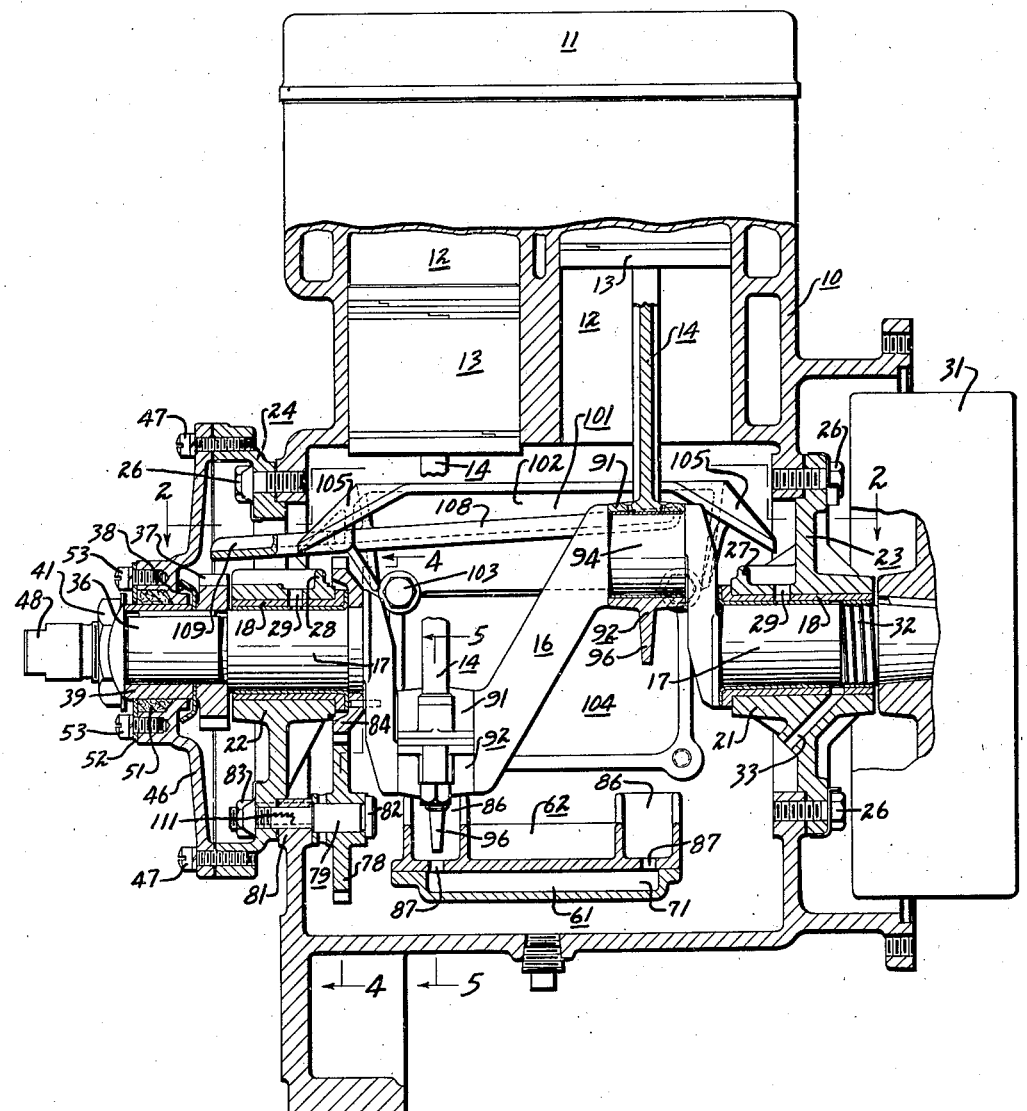
Fig. 1 is a longitudinal vertical section of an internal combustion engine employing the novel lubricating system disclosed herein, the view being taken on the center line of the crankshaft.

The internal combustion engine disclosed herein is of small size and of the type adapted for intermittent operation, as for example, the auxiliary starting engine for a compression ignition engine such as disclosed in the co-pending application of Carl G. A. Rosen, No. 684,179, filed August 8th, 1933. It is essential in this type of engine that it be instantly available for service at all times, and, to avoid damage to the engine, it is necessary that a supply of lubricant be instantly available to the various bearing surfaces of the engine. In providing a lubricating system for such an engine, it is desirable to avoid an expensive construction and the expensive machining processes which are necessarily present, where a lubricant pump is provided and bored passages are provided through the crankcase and the crankshaft.

The lubricating system disclosed herein provides an instantly available source of lubricant for the bearing surfaces of the engine, the lubricant being supplied in part by a gravity flow of splashed lubricant. An auxiliary lubricant reservoir is provided in the form of troughs which are supplied with lubricant by power driven means and from which lubricant is splashed to a distributor which conducts it to certain of the bearing surfaces of the engine.

The internal combustion engine comprises combined crankcase and engine block 10 (Fig. 1) on which head 11 is suitably secured. Cylinders 12 are provided by internal walls of block 10 which receive pistons 13 connected by rods 14 with crankshaft 16. Suitable intake and exhaust valves and spark ignition means of conventional type may be provided, as shown, for example, in the above noted application.

Crankshaft 16 (Fig. 1) has main bearing portions 17 journaled in bushings 18 seated in respective bosses 21, 22 of covers 23, 24, which close aligned apertures in the end walls of block 10, being secured thereto by cap screws 26. Bosses 21, 22 (Figs. 1 and 2) are provided at the top with vertical flanges 27, 28, forming lubricant receiving cups to which lubricant is supplied in a manner later described. It is to be noted that flange 28 is open at its outer end to transmit excess lubricant from the cup to the projecting end of the crankshaft. Within the cups, apertures 29 are provided to transmit lubricant therefrom to the bearing surfaces of portions 17. The right end of crankshaft 16 as viewed in Fig. 1 extends through boss 21 and has flywheel 31 secured thereon. Adjacent flywheel 31 spiral lubricant return grooves 32 are provided on crankshaft 16, serving to return lubricant through passage 33, in boss 21 to the lubricant sump formed by block 10. At its left end, crankshaft 16 extends through boss 22 and has reduced portion 36 having gear 37, lubricant thrower 38, and spacer 39 keyed thereon between nut 41 and the shoulder formed between bearing portion 17 and reduced portion 36. Cover 46 secured to cover 24 by screws 47 forms therewith an auxiliary housing secured to block 10 which houses a drive connection to the cam-shaft, not shown, from gear 37. To the left of nut 41, crankshaft 16 is formed at 48 to receive a drive connection for cranking the engine. Spacer 39 is engaged by seal 51 seated in cover 46 and held in place by retainer 52 and screws 53.

The lubricating system includes an auxiliary reservoir to which lubricant is supplied by a power driven element and from which lubricant is conveyed by means of bearing cap extensions to the various bearing surfaces of the crankshaft, a distributor being provided to receive thrown lubricant from the bearing cap extensions and convey it by gravity to the desired location. The auxiliary lubricant reservoir comprises pan 61 (Figs. 1, 2 and 5) having cover 62 secured thereon by bolts 63 (Fig. 2). Cover 62 (Figs. 2 and 5) has bosses 64 threaded to receive studs 66 extending through bosses 67 in block 10, spacers 68 being interposed between bosses 64 and bosses 67. Pan 61 and cover 62 are castings of aluminum or other suitable material of light weight.

Pan 61 is provided with a lubricant conduit terminating in a lubricant inlet through which lubricant is supplied by a rotatable gear. Pan 61 (Fig. 2) has longitudinal passage 71 which communicates through aperture 72 with passage 73 leading to inlet 74 (Figs. 2, 4 and 5). Inlet 74 is formed by inwardly converging walls 76, 77 (Fig. 4) providing a funnel shaped inlet opening into which lubricant is thrown by gear 78 rotatably mounted on stub shaft 79 (Figs. 1 and 4) in boss 81 of block 10, gear 78 being held thereon by head 82 of stub shaft 79 and nut 83. It is to be noted that stub shaft 79 also serves as a means for securing cover 24 to block 10. Gear 78 meshes with gear 84 on crankshaft 16, and, as it rotates, transfers lubricant through inlet 74, conduit 73, and opening 72, and conduit 71.

Cover 62 (Figs. 1, 2 and 5) is provided with spaced trough portions 86 which communicate with conduit 71 through respective apertures 87. It is to be noted in Fig. 5 that inlet 74 is positioned a substantial distance above troughs 86 so that, after lubricant is thrown into funnel shaped inlet 74 by thrower 78, a gravity flow is provided through conduit 73 (Fig. 2), opening 72, conduit 71, and apertures 87 into troughs 86.

Lubricant is transferred from the troughs by bearing cap extensions which pass therethrough during rotation of the crankshaft. Each connecting rod 14 (Fig. 5) terminates in bearing portion 91 to which bearing cap 92 is secured by studs 93, whereby the connecting rod is secured to bearing portion 94 of crankshaft 16. Bearing cap 92 has integral extension 96 and has opposite apertures 97 adjacent the foot of the leading and trailing edges of extension 96, through one of which lubricant is transmitted to the connecting rod bearing surfaces of the crankshaft. The pair of apertures 97 provide for assembly of bearing cap 92 in reverse positions.

The bearing cap extensions or elements also provide means for transferring lubricant to the lubricant distributor which is secured to the wall of the block and transmits lubricant by gravity flow to certain bearing surfaces of the engine. Distributor 101 (Figs. 1, 2 and 3) includes arcuate body portion 102 secured by bolts 103 to block 10, said bolts also serving to secure cover 104 to said block. The concave surface of body portion 102 faces extensions 96 during rotation thereof and receive the lubricant thrown therefrom, certain lubricant also being received on the convex surface of body portion 102. At its ends (Figs. 1 and 2) body portion 102 terminates in downwardly extending triangular projections 105 having their ends overlying respective lubricant receiving cups 27, 28 whereby lubricant is transmitted to the bearing surfaces of main bearing portions 17 of the crankshaft. Integral with body portion 102 of the distributor, trough portion 108 (Figs. 1, 2 and 3) is provided, which extends downwardly and outwardly, projecting at 109 within the auxiliary housing provided by covers 24, 46. The end of trough portion 108 overlies gear 37 and the gear meshing therewith to supply lubricant thereto. Lubricant is returned from the auxiliary housing to the lubricant sump formed in block 10 through apertures 111 (Figs. 1 and 4). From the foregoing, it is seen that the lubricant distributor or baffle has a plurality of integral projections which overlie certain bearing portions of the engine providing a gravity flow of lubricant thereto.

We, therefore, claim as our invention:

1. In an internal combustion engine, a body portion; a crankshaft having main bearing portions, and connecting rod bearing portions; a lubricant reservoir comprising a tray secured to said body portion and spaced from the bottom thereof, said tray having lubricant inlet and conducting passages, and a cover for said tray having troughs disposed transversely of said crankshaft axis and having an opening communicating with said passages to allow flow of lubricant into said troughs; power driven means for supplying lubricant to said inlet to fill said troughs; and bearing members engaging said connecting rod portions and having extensions adapted to dip into said troughs during rotation of said crankshaft, said bearing members being apertured adjacent the base of said extensions to conduct lubricant to the bearing surfaces of said bearing members and said crankshaft.

2. In an internal combustion engine, a body portion; a crankshaft having main bearing portions, and connecting rod bearing portions; a lubricant reservoir comprising a tray secured to said body portion and spaced from the bottom thereof, said tray having lubricant inlet and conducting passages, and a cover for said tray having troughs disposed transversely of said crankshaft axis and having an opening communicating with said passages to allow flow of lubricant into said troughs; power driven means for supplying lubricant to said inlet to fill said troughs; bearing members engaging said connecting rod portions and having extensions adapted to dip into said troughs during rotation of said crankshaft; and a lubricant distributor mounted on said body portion adapted to receive lubricant from said extensions and having downwardly extending projections overlying said crankshaft main bearing portions.

3. In an internal combustion engine, a body portion; a crankshaft having main bearing portions, and connecting rod bearing portions; a lubricant reservoir comprising a tray secured to said body portion and spaced from the bottom thereof, said tray having lubricant inlet and conducting passages, and a cover for said tray having troughs disposed transversely of said crankshaft axis and having an opening communicating with said passages to allow flow of lubricant into said troughs; power driven means for supplying lubricant to said inlet to fill said troughs; bearing members engaging said connecting rod portions and having extensions adapted to dip into said troughs during rotation of said crankshaft; and a lubricant distributor mounted on said body portion adapted to receive lubricant from said extensions and having downwardly extending projections overlying said crankshaft main bearing portions, said bearing members being apertured adjacent the leading side of said extensions to conduct lubricant to said connecting rod bearing portions.

4. In an internal combustion engine, a crankshaft, a lubricant reservoir, an element mounted for rotation with said crankshaft and adapted to pick up lubricant from said reservoir, a gear on said crankshaft for transmitting a drive therefrom, and a distributor adapted to receive lubricant from said element and conduct such lubricant to bearing surfaces of said crankshaft, said distributor comprising a curved portion terminating at its ends in downwardly extending tips overlying the bearing surfaces of said crankshaft, and a trough portion having an open end overlying said gear.

5. In an internal combustion engine, a lubricant reservoir, a crankshaft including a crank arm, a connecting rod, a reversible bearing cap for journaling said rod on said arm, said cap having an extension adapted to pass through said reservoir upon rotation of said crankshaft, and having conduits therein for transmitting lubricant from the leading side of said extension in either mounted position of said cap, to the bearing surface of said cap with said arm.

6. In an auxiliary internal combustion engine adapted for starting a main engine, an engine block, a crankshaft having its end portions journaled in said block, a connecting rod bearing cap journaled on an intermediate crank portion of said crankshaft, a lubricant trough mounted above the bottom of said block and below said cap, a conduit for conducting lubricant to said trough, a toothed lubricant thrower adjacent said conduit and driven from said crankshaft for collecting lubricant from the bottom of said block and delivering said lubricant into said conduit, a projecton on said cap adapted to collect lubricant from said trough upon rotation of said crankshaft, said cap being apertured to allow passage of lubricant therethrough, and a distributor positioned adjacent the path of rotation of said projection for receiving lubricant therefrom, said distributor having means to conduct the lubricant to the end portions of the crankshaft.

7. In an internal combustion engine, a body portion; a crankshaft having main bearing portions, and connecting rod bearing portions; a lubricant reservoir comprising a tray secured to said body portion and spaced from the bottom thereof, said tray having lubricant inlet and conducting passages, and a cover for said tray having troughs disposed transversely of said crankshaft axis and having an opening communicating with said passages to allow flow of lubricant into said troughs; means for supplying lubricant to said inlet to fill said troughs; and bearing members engaging said connecting rod portions and having extensions adapted to dip into said troughs during rotation of said crankshaft.

ROY E. MAYO.
JAMES M. DAVIES.